United States Patent [19]
Mowry

[11] Patent Number: 5,406,326
[45] Date of Patent: * Apr. 11, 1995

[54] VIDEO SYSTEM FOR PRODUCING VIDEO IMAGE SIMULATING THE APPEARANCE OF MOTION PICTURE OR OTHER PHOTOGRAPHIC FILM

[75] Inventor: Craig P. Mowry, New York, N.Y.

[73] Assignee: Harry E. Mowry, New York, N.Y.

[ * ] Notice: The portion of the term of this patent subsequent to Dec. 20, 2011 has been disclaimed.

[21] Appl. No.: 246,739

[22] Filed: May 20, 1994

Related U.S. Application Data

[63] Continuation of Ser. No. 922,701, Aug. 6, 1992, which is a continuation-in-part of Ser. No. 595,082, Oct. 11, 1990, Pat. No. 5,140,414.

[51] Int. Cl.⁶ ............................................. H04N 3/36
[52] U.S. Cl. ...................................... 348/104; 348/97; 348/103
[58] Field of Search .......................... 358/518, 527; H04N 1/46, 3/36; 348/96–104

[56] References Cited

U.S. PATENT DOCUMENTS

| | | |
|---|---|---|
| 3,772,465 | 11/1973 | Vlashos et al. |
| 4,331,979 | 5/1982 | Bendell . |
| 4,418,358 | 11/1983 | Poetsch et al. |
| 4,642,700 | 2/1987 | Ohta et al. |
| 4,694,345 | 9/1987 | Rodgers . |
| 4,771,342 | 9/1988 | Beesley . |
| 4,901,161 | 2/1990 | Giovanella . |
| 4,935,816 | 6/1990 | Faber . |
| 5,140,414 | 8/1992 | Mowry . |
| 5,166,783 | 11/1992 | Hodgson . |
| 5,223,891 | 6/1993 | Fierstein et al. |
| 5,335,013 | 8/1994 | Faber ................................. 348/104 |

FOREIGN PATENT DOCUMENTS

| | | |
|---|---|---|
| 2243515 | 10/1991 | United Kingdom . |
| 2244626 | 12/1991 | United Kingdom . |
| 9103903 | 3/1991 | WIPO . |

Primary Examiner—Edward L. Coles, Sr.
Assistant Examiner—Kim Yen Vu
Attorney, Agent, or Firm—Ostrolenk, Faber, Gerb & Soffen

[57] ABSTRACT

Digital signals are generated and stored for each pixel of a frame of a preferably high definition video originated material. A computer reads the digital signals and converts them to binary image data by employing a selected look-up-table program to reassign color and black component values for each pixel. The programs applied in the component value reassignments are compiled from, and based on, comparative digital video component results of telecined film stocks' responses to selected color and grey scale gradients as charted against a selected video unit's response to the same charts under a selected number of identical lighting circumstances. A projector unit projects the high definition video frame through a macro lens onto a strip of exposed and processed motion picture or other photographic film of an optional grey scale gradient and thus grain pattern density. A precisely aligned, compatible high definition camera unit provides a synching signal to the projector and automatically frames and focuses on the projected image from the reverse side of the celluloid surface, scanning the projected scan lines, to output the grain-embodying image for recording and displaying on a high definition format or external conversation to NTSC for broadcast purposes.

8 Claims, 4 Drawing Sheets

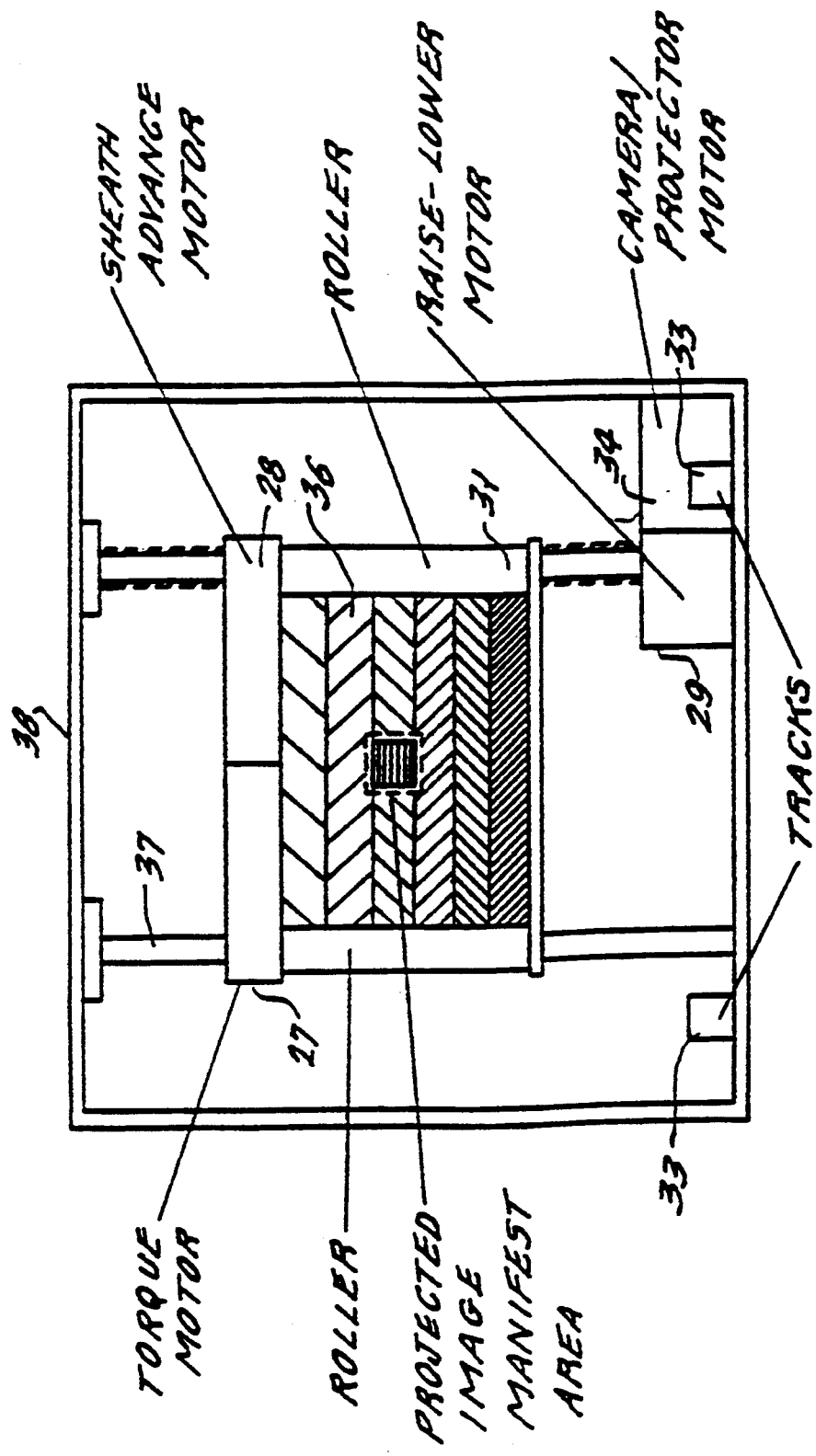

VIDEO SYSTEM FOR PRODUCING VIDEO IMAGE SIMULATING THE APPEARANCE OF MOTION PICTURE OR OTHER PHOTOGRAPHIC FILM

BACKGROUND OF THE INVENTION

This is a continuation of allowed Ser. No. 07/922,701, filed Aug. 6, 1992, which is in turn a continuation-in-part of Ser. No. 07/595,082, filed Oct. 11, 1990, now U.S. Pat. No. 5,140,414.

OBJECT OF THE INVENTION

The system of the present invention seeks to arrive at an aesthetically acceptable simulation of the appearance images originated on different motion picture and other photographic film stocks embody after telecine "flying spot scanner" transfer to video, from taped high definition video originated images. Furthermore, the invention seeks to provide new options in processing video originated material, not limited to approximating the results images originated on a film stock would have manifested on video of a given videographic subject.

This invention relates to the simulation of video images originated on motion picture and other photographic film stocks, from high definition video originated material stored on video tape.

Film has been the preferred recording medium on which to originate many productions broadcast on television for years because of the sophisticated visual impression provided by the character of film stocks' color response and the general audience familiarity with the appearance resulting from filmed material presented on television; the resulting "look", a product of the photochemical process preceding the production of television signals representative of the image stored in the photochemical process, differs in several ways from video originated material of an identical photographic subject. Two key ways in which they differ are the focus of this invention: The color and grey scale component value response in each pixel of the resulting image on a television monitor; and the subtle visual impression made by the textured appearance of film grain, which is inherent to images stored within motion picture film emulsion and photographic film in general.

Though color negative film has the ability to reproduce abundantly more color and grey scale gradients than video originated images, when video images are created from filmed images by means of a standard telecine "flying spot scanner" transfer, an illusion of the entire range of film's color response is maintained. This phenomenon, occurring within the scope of the video medium, provides that constants exist that can define the variation in pixel response between film and video originated images shot under identical lighting conditions, when viewed on video monitors: It is the combination of filmed information as it can be reproduced on a monitor that provides the overall maintenance of the "film look", and each separate color component combination of each pixel of film originated image is in fact available and employed by video originated images, though in response to a different photographic stimulus in almost every case.

The video data resulting from a telecine transfer defines filmed images in video terms, so the medium in question is in fact video, and the parameters and actual subtleness of projected filmed images are not the issue. Rather, the video data assigned to a resulting pixel representing a zone of film emulsion is an averaging process provided by video standards and color and grey scale gradients recognized as those registered and visible on standard television receivers.

Digital video technology has provided that digital data defines video images and encodes the color and grey component values for each pixel in addressable sequences, able to be "read" and "rewritten" into a store. Therefore, given uniform and predominantly shadow-free lighting and even color temperature during original videotaping, and careful slating of this data for each shot in foot candles and degrees kelvin respectively, digital data logged from pixel response of color data originally stored in film stock emulsion, under the same light intensity and color temperature conditions, can be referenced according to principal videographic variables and inserted in place of the original video color data. This would create an aesthetic compromise that permits approximation of potentially any film stock's anticipated response to the same stimulus represented in video form.

Existing technology for the printing industry and digital video provide for scan-sequential and specifically addressed pixel component modifications according to look-up-table data, as the system of the present invention employs, (i.e. U.S. Pat. Nos. 4,727,425; 4,710,806).

New high definition television systems and video projection systems capable of manifesting a high definition compatible number of scanning lines provide the means for executing a process whereby actual film grain within celluloid emulsion can be married with a projected image, and videographed with a loss in image clarity low enough to produce a final result which provides a film "look" to images at an aesthetically acceptable sacrifice to the original high definition integrity of the video images. Present systems strive to simulate film grain appearances digitally, with a result that is visibly different from actual film grain appearances on monitors, following a telecine "transfer." By incorporating the general videography-of-film operating basis of telecine devices, high definition projection and camera units mounted on tracks, with macro lensing, "genlock" synched together, and matching scan lines to the highest degree possible, can capture a complete video frame as it is projected on a grey emulsion surface of optional size. This recreation of a video signal of a high number of scanning lines from a high definition projection would have a resulting actual clarity substantially less than that of the original video material, but with the aesthetic look of film originated images. Present systems for providing an NTSC signal from a high definition signal may be employed at this stage, or the signal may be maintained as a higher definition signal for recording, monitoring or broadcasting.

So, for many television applications where film is shot for telecine transfer to video, there are benefits to be gained by employing the system of the present invention. At the production level: a television camera is employed instead of a film camera, providing silence; immediate screening of the actual material shot; immediate sound synching; lesser risk of reshoots from screening original material for problems immediately; and no expense of negative film. In post production: processing of film, transfer to video and sound synching are not needed; having shot video, dailies need not be awaited; all shot selections destined for final modification by the "FILMITATOR" system are made at preliminary "off-line" edit sessions, minimizing the actual amount of material submitted for modification and thus time charges as opposed to a film shoot where typically all material must be transferred to tape, at substantial expense, for initial screening; and during modification by this system, a variety of film stock component response and film grain options may be previewed and imparted to the original video material, providing a unique range of new post-production aesthetic effects to video originated material.

United States patents providing a general background to the present invention are as follows:

| | | | |
|---|---|---|---|
| 3,637,937 | 1/1972 | Deveson | 355/83 |
| 3,707,599 | 12/1972 | Brown | 358/346 |
| 4,268,865 | 5/1981 | Millward | 358/216 |
| 4,389,668 | 6/1983 | Favreau | 358/83 |
| 4,453,178 | 9/1984 | Moriguchi | 358/60 |
| 4,514,818 | 4/1985 | Walker | 364/521 |
| 4,633,416 | 12/1986 | Walker | 364/521 |
| 4,684,990 | 8/1987 | Oxley | 358/22 |
| 4,710,806 | 9/1987 | Iwai/Uno | 358/81 |
| 4,727,425 | 9/1988 | Mayne | 358/80 |
| 4,771,342 | 9/1988 | Beesley | 358/335 |
| 4,782,397 | 9/1988 | Kimoto | 358/252 |
| 4,839,721 | 9/1989 | Abdulwahab | 358/80 |
| 4,885,787 | 9/1989 | Okamoto/Kida | 382/54 |
| 4,894,724 | 9/1990 | Welkowsky | 358/231 |
| 4,899,216 | 9/1990 | Tatsumi | 358/80 |
| 4,901,161 | 9/1990 | Giovanella | 358/346 |
| 4,901,258 | 9/1990 | Akiyama | 364/577 |

SUMMARY OF THE INVENTION

The system according to the present invention provides means for digitally modifying high definition video originated images shot under even, controlled lighting conditions, according to look-up table programs based on film-originated digital color and black component binary response logs.

The invention furthermore provides a secondary means for imparting a variety of possible film-grain "textured" appearances to the image resulting from the primary modification with an apparatus which videographs a video projection of the color modified, high definition video signal from off an emulsion layer of variably dark strips of motion picture film.

Standard video response to each gradient of red, green, blue and black distinguishable by broadcast television is derived from analyses of digital response data to color chart gradients, by a predictably responsive high definition video camera model, designated as a component of this system. The film originated digital "responses" are derived from cinematography of the same color charts under the same lighting conditions, with the conversion to digital video provided by a precisely adjusted telecine, "flying spot scanner" apparatus; binary data pertaining to single pixel component values are then logged accordingly. These digital results; the range of original video color data each digital "response" commands; and the number of charts assembled for a given film stock program, (designated and compiled according to combinations of original videography lighting conditions), define the amount of data held within each "look up chart" program and thus the color and grey-scale gradient reproduction detail available in a given film stock simulation program.

According to one aspect, the invention relates to a video signal modification system for converting video originated images into final video images simulating images originated from photographic film stocks, the modification system including: means for modifying component values of pixels within the video originated image to approximate anticipated component results of each pixel had a selected film stock been the original image storing medium; computing means coupled to said modifying means for reassigning values for said component values of picture pixels in said video originated images for substantially each said picture pixel within each frame of said video originated images in dependence on said modified component value selected from said modifying means and thereby producing intermediate video images; and means for producing said final video images from said intermediate video images.

According to this embodiment, the means for modifying comprises means for holding conversion data which correlates component values of picture pixels in the originated images with modified component values, the conversion data being selectible for the picture pixel based on a plurality of parameters; the conversion data being compiled and recallable according to a selected photographic film stock to be simulated and according to a selected photographic film stock to be simulated and according to principal videographic variables.

The principal videographic variables comprise any one or any combination of the following parameters which include:

(a) color temperature of light illuminating the subject area being videographed;

(b) brightness of light illuminating the subject area being videographed; and (c) a selected camera setting of a camera used to originate images destined for modification.

According to another aspect, the invention relates to a video signal modification system for simulating video images originated on photographic film stocks from video originated images, including: computing means for reassigning color and black component values for each pixel, within each frame of a video originated image, based on digital component modifications; computing means for reassigning values for the component values for substantially each picture pixel within each frame of the video originated images in dependence on the modified component value and thereby producing intermediate video images; means for instilling selected film grain patterns of optional density and size to the intermediate video images; and final image producing means for producing the final video images from the intermediate video images which have had the film grain patterns instilled therein.

According to yet another aspect, the invention relates to a method for converting video originated images into final video images simulating images originated from photographic film stocks, the method including:

modifying component values of pixels within the video originated image to approximate anticipated component results of each pixel had a selected film stock been the original image storing medium;

reassigning values for the component values of picture pixels in the video originated images for substantially each picture pixel within each frame of the video originated images in dependence on the modified component value selected from the memory and thereby producing intermediate video images; and producing the final video images from the intermediate video images.

According to yet still another aspect, the invention relates to a method for simulating video images originated on motion picture or other photographic film stocks from video originated images, including: reassigning color and black component values for each pixel, within each frame of a video originated image, based on digital component modifications; reassigning values for the component value for substantially each picture pixel within each frame of the video originated images in dependence on the modified component value and thereby producing intermediate video images; instilling selected film grain patterns of optional density and size to the intermediate video images; and producing the final video images from the intermediate video images which have had the film grain patterns instilled therein.

According to yet still a further aspect, the invention relates to a method for simulating video images originated on motion picture or other photographic film stocks from video originated images, including: reassigning color and black component values for each pixel, within each frame of a video originated image, based on digital component modifications; storing programs on which the digital component modifications are based, instilling film grain patterns of optional density and size, to the images resulting from a videoprojection of frame store data derived from primary digital modification; and videographing the videoprojection with a camera unit, aligned to and with technical means to maintain a high degree of the projected image's integrity.

According to yet still another aspect, the invention relates to a method for converting video originated images into final video images simulating images originated from motion picture or other photographic film, the method including: storing in a memory conversion data correlating color and black component values of picture pixels in the video originated images with modified component values, the conversion data being selectible for the picture pixels based on a plurality of parameters including lighting conditions; reassigning values for the color and black component values for substantially each picture pixel within each frame of the video originated images in dependence on the modified component values selected from the memory thereby producing intermediate video images; instilling selected film grain patterns of optional density and size into the intermediate video images; and producing the final video images from the intermediate video images which have had the film grain patterns instilled therein.

According to yet still a further object, the invention relates to a method for converting video originated images into final video images simulating images originated from motion picture or other photographic film, the method including storing conversion data in a memory correlating color and black component values of picture pixels in the video originated images with modified component values, the conversion data being selectible for the picture pixels based on a plurality of parameters including lighting conditions and camera setting; reassigning values for the component values for substantially each picture pixel within each frame of the video originated images in dependence on the modified component values selected from the memory and thereby producing intermediate video images; and producing the final video images from the intermediate video images.

In summary, the present invention provides a video signal modification system for converting video-originated images into final video images simulating images originated from motion picture and other photographic film. To this end, conversion data located in, e.g., look-up tables, are used for reassigning color and black component values to the picture pixels in the video-originated images with the help of computing means thereby to produce intermediate video images. Grain pattern instilling means physically instill selected film grain patterns of optional density and size into the intermediate video images thereby to produce final video images which appear as though they were derived from motion picture or other photographic film stock.

Other features and advantages of the present invention will become apparent from the following description of the invention which refers to the accompanying drawings.

BRIEF DESCRIPTION OF THE DRAWINGS

FIG. 4 shows in detail, the celluloid containment assembly portion of the film grain-instilling apparatus, from the viewpoint of the camera unit of the film grain-instilling apparatus.

DRAWINGS REFERENCE NUMBER

1—High definition camera; principal videography
2—High definition record VTR
3—Slate with system relevant data for each scene
4—High definition playback VTR
5—Analog-Digital converter
6—Frame store
7—System computer/pixel data digital modifier
8—System keyboard
9—Disc drive
10—Film stock component simulation program
11—Frame store
12—Digital-Analog converter
13—Film grain simulator/instiller apparatus
14—High definition master record VTR
15—High definition monitor
16—Optional, external signal peaking/filtering systems
17—Optional, external manual color correction device
18—High definition-NTSC converter
19—NTSC broadcast format record deck
20—NTSC monitor
21—High definition video projector
22—High definition camera
23—Variable macro lens for projector
24—Variable macro lens for camera
25—Auto focus puller from 35 mm to 16 mm image width
26—Camera auto focus puller, 35 mm to 16 mm image width
27—Torque motor
28—Intermittent advance motor
29—Roller/celluloid sheath assembly raise-lower motor
30—Assembly support/reposition screw 31—Assembly celluloid containment rollers
32—Projected image manifest zone
33—Tracks
34—Projector and Camera dolly in-out motor
35—Projector/Camera reposition screw
36—Variable density celluloid sheath/length
37—Fixed assembly support pillar
38—Assembly frame
39—Camera to projector synch generator
40—Variable density projector filter
41—Projector filter reposition motor
42—Celluloid sheath plane tension/stabilization rollers
43—Principal videographic data input controls; X-color temperature; Y-brightness; Z-t-stop or other additional data

SYSTEM FUNCTION SIGNALS

D1—Playback deck, single frame advance signal
D2—Keyboard to system computer data
D3—Look-up-table data, to computer internal memory
D4—Camera/Projector 35 mm–16 mm reposition signal
D5—Camera/projector 35 mm–16 mm refocus signal
D6—Celluloid assembly raise/lower signal and projector filter raise/lower signal
D7—Celluloid containment rollers intermittent advance signal
D8—Gen. lock signal from camera synch generator
D9—Master record, single frame insert record signal

DETAILED DESCRIPTION OF THE PREFERRED EMBODIMENT

Figure 1:
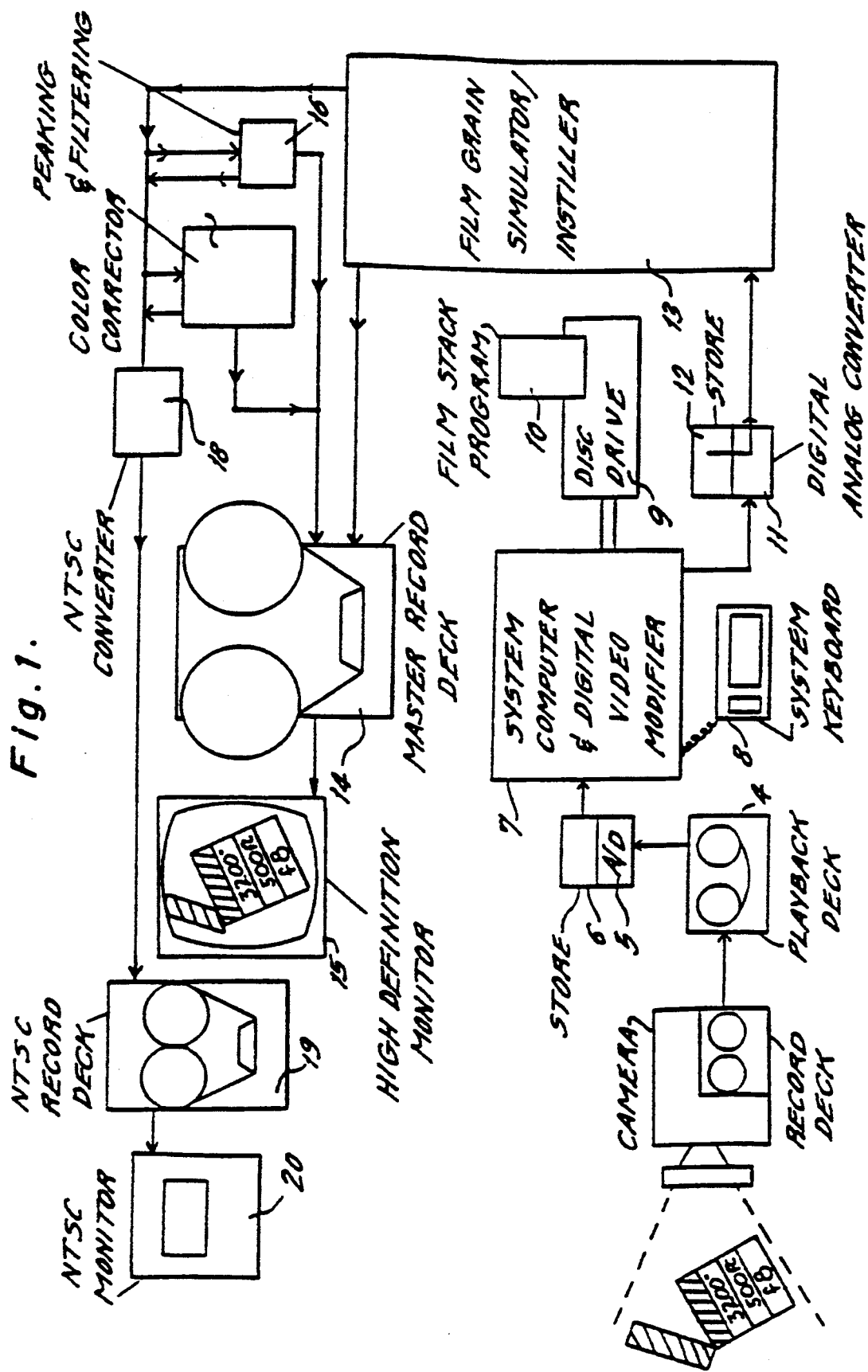
FIG. 1 is a block diagram of the video modification system and the path of video signals therein.

In FIG. 1, the production stage of this system includes: a high definition video signal being provided by a selected camera 1, capable of outputting a signal derived from an oscillatory scan or preferably from a unit that performs an initial scan of at least double the 525 lines per two fields of NTSC television, which is recorded by a selected, compatible VTR 2, capable of taping the high definition signal. Lighting conditions at principal videography are conformed to one of the available lighting variable combinations, explained in detail later. These variables, namely the selected camera f-stop setting for a scene, the average brightness of the scene in foot candles, and the average color temperature of the scene in degrees Kelvin, are slated for the camera before each take, 3, or recorded onto a data track corresponding to each scene, as input through principal videographic data input controls, 43; camera setting information may be recorded automatically on to this data track leaving only lighting variables to be input manually, with the option of allowing other external devices to relay lighting and/or other principal videographic data for recording on the data track, replacing the step of slating the variable for the camera to provide visual reference to the system operator in post production. For best results in the primary color component modification process of this system, the color temperature and brightness of each zone within the area being videographed must be as uniform as possible, and illuminated by diffused, low-key lighting that discourages shadowing.

Figure 2:
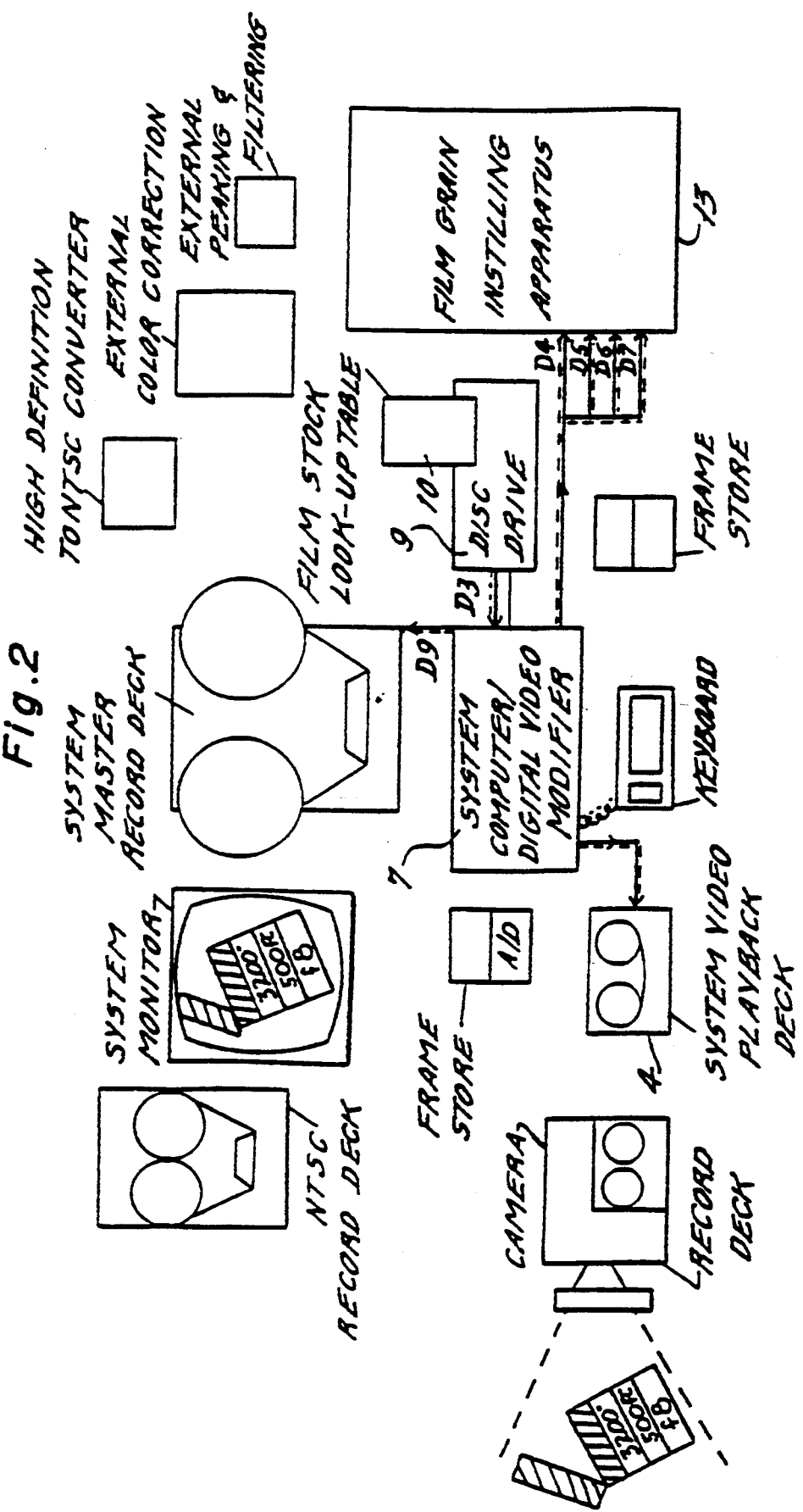
FIG. 2 diagrams the flow of system control data in the block diagram of FIG. 1, including: component advance, timing, system options, video synching and insert editing signals.

In the post-production stage of this system, FIG. 1 diagrams the path of the video signal, while FIG. 2 diagrams the flow of system data which controls timing, positioning, synching and advancing of system components. In response to a frame-advance signal D1, the high definition playback deck 4, advances one frame, and outputs this single frame of video data to analog-digital converter 5. The binary data is held in frame store 6, and read from this store by system computer 7, at the rate dictated by the time required to modify data for each red, green, blue and black component for each pixel, scan-sequentially. To perform this digital modification, a single, selected look-up-table 10, is read by disc drive 9 and relayed as data D3 to the internal memory of the system computer 7, in accordance with a table select command entered through the system computer keyboard or data referenced on the principal videographic variables recorded data track.

The look-up-table selected is of the one-dimensional kind and is an element of a larger program which is representative of component responses of video material originated on a single film stock, in a variety of lighting circumstances. The digital representation of the film component responses are derived from telecine, flying-spot-scanner transfer to videotape: By filming color charts and grey scale charts containing at least those gradients deemed registrable by broadcast NTSC television and charting the binary component-data results against video originated images, shot with the selected high definition camera unit of this system, of the same charts under the identical lighting conditions, a basis for translation is formed. A simple film stock program might contain tables for five f-stop settings, ten light intensity possibilities and five color temperature options; a total of 250 look-up tables, contained on discs or another storage medium grouped according to f-stop setting, or depending on the volume of data within each table, an f-stop and a color temperature, with all lighting intensity options for the two fixed variables resulting in ten tables per disc, etc.

Within a look-up-table, the component value translations may be as specific as to address the actual subtlety of film and the large number of color and grey scale gradients color negative film can register. Because the process is designed for eventual display on a video monitor, however, the degree of specificity needed is immediately diminished by the inherent limitations of video. If data groupings of video data derived from videography of the charts are to be defined by those component gradients registrable by NTSC broadcast television, the range of original video component data in a single grouping is broadened further, and number of corresponding look-up-table "answers" are reduced in comparison to the huge number of groupings that might be logged. So, the degree of detail available within a single look-up-table, or the table's capacity, is determined by the intended display system and a determined level of modification deemed acceptable as a compromise between the size of the tables to be assembled and the aesthetic result of the component modifications; it is an option determined by the intricacy of a given program assembled for this system as implemented by a system computer internal memory capable of storing at least a single table of the greatest detail that might be needed for the most sensitive monitoring systems applicable.

Each component's digital "word" is thus read, for each pixel, and replaced by the corresponding answer "word" which is referenced in the table and determined to govern the range of original videography data in which the "word" submitted falls. The binary response, indicating the approximate anticipated component value response had the program film stock been the original image storage medium, is output to a receiving frame-store 11, in which the revised frame of digital video data is assembled. This data is then converted to analog format by digital-analog converter 12, and is relayed at normal scanning rate, for display, to apparatus 13 for a secondary modification.

Figure 3:
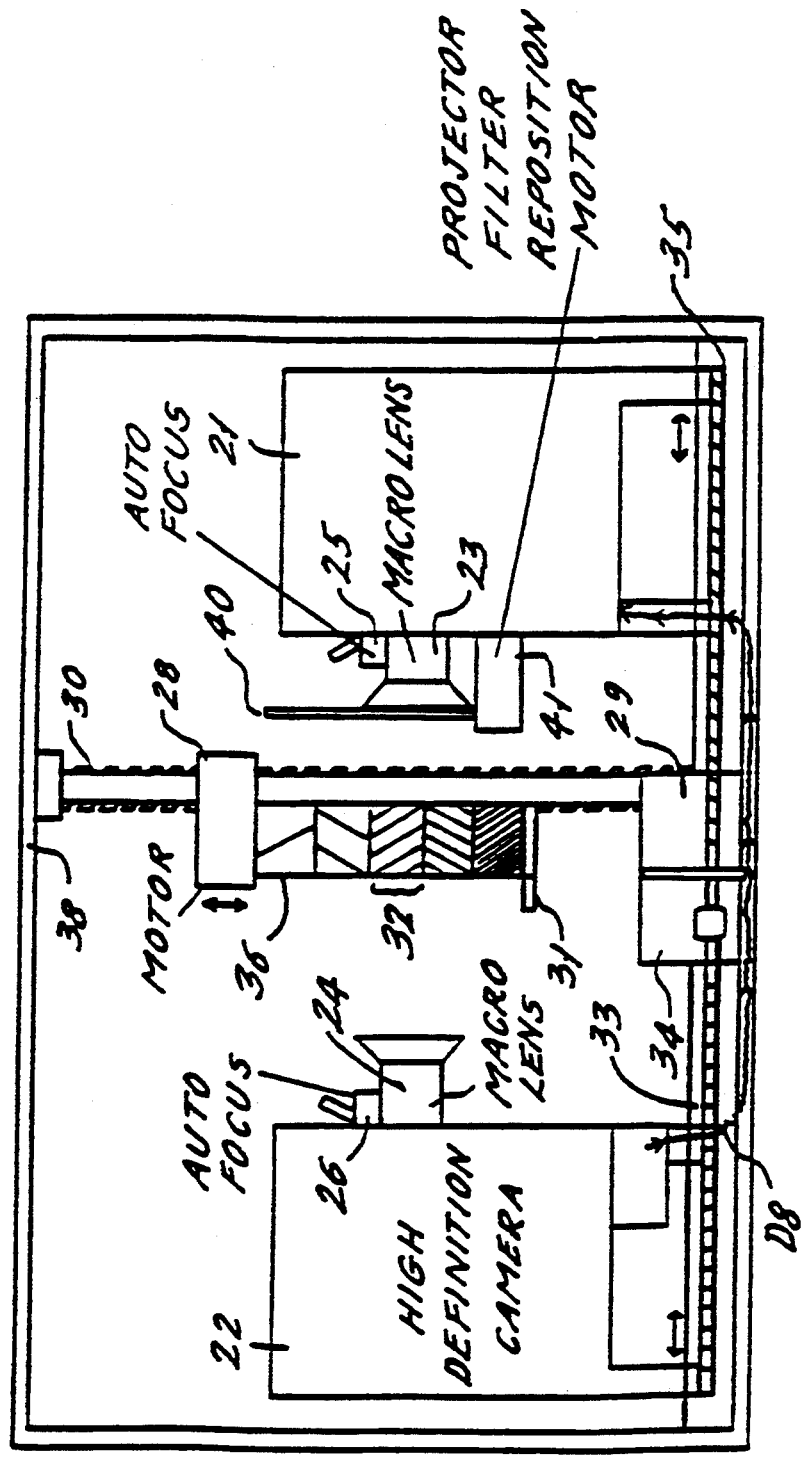
FIG. 3 shows in detail, the variable density film grain-instilling apparatus from the left side.

Apparatus 13 is designed to instill physically a variety of actual film-emulsion grain appearances to images manifested from the primary digital modification process of this system. As detailed in FIG. 3, diagramming the film-grain instilling apparatus, high definition projection unit 21 is the component which receives the modified high definition analog video signal. This projection unit is preferably of the type capable of reproducing the level of definition and number of scan lines provided by the video signal. Facing the projection unit lens is a high definition camera unit 22, to which the projector is gen-locked, by means of a synching signal D8, output to the projector by the camera unit internal synch generator 39. The camera and projector are mounted on tracking 33, which is itself fixed in the film grain instilling apparatus assembly frame, 38. By means of motor 34, the camera and projector units move simultaneously toward or away from each other in response to a signal D4 output by the system computer, which commands the units to approach each other a short distance if 16 mm film grain is to be simulated, or to move away to simulate a 35 mm grain size. Other mechanical means to vary the lens positions of the camera and projector units, 21 and 22, may also be employed in lieu of tracking, providing means to vary the size of the projected image manifest zone and corresponding framing of the camera, with the units 21 and 22 remaining fixed in the apparatus assembly frame, 38. Variable focus, macro lenses 23 and 24, on both the projector unit and the camera unit also respond accordingly to system computer generated signal D5 by focusing for an image manifest area of either 16 mm or 35 mm in width automatically, as provided by focus-pulling motors 25 and 26.

Between the camera and projector lenses is a grain embodying, light transmissible surface, preferably comprising a sheath of celluloid 36, and preferably comprised of reversal motion picture film stock, which is contained between two rollers 31, and kept taut between the containment rollers by torque motor 27. Stabilization rollers with the ability to rotate, 42, are mounted in the assembly frame 38, as are the sheath containment rollers, and these stabilization rollers hold the section of celluloid on which the videoprojection is manifested on one plane, relative to the projector and camera lenses, at all times. Being of at least a meter in length and at least 175 mm in width, (meaning top to bottom in FIG. 4), the portion of the celluloid length not visible between the containment rollers, is "spooled" on the rollers. Comprised from top to bottom of 35 mm strips of different grain density and thus darkness, the celluloid length is a continuous piece containing grey scale gradient strips created by actually exposing and processing the celluloid-film sheath for this use, accordingly.

Supported by roller assembly support 37 and support screw 30, which are mounted in celluloid roller assembly support frame 38, the rollers and celluloid length can raise or lower, placing a grey celluloid strip of a different darkness in line with the projector beam's image manifest area 32, as assembly raise-lower motor 29 turns support screw 30, in response to data received from the system computer as signal D6. Also in accordance with the D6 signal, a variable density filter 40, mounted over the lens of the projector unit, is repositioned to a density section, by motor 41, to compensate for the darkness of the celluloid density strip selected on which to manifest the projection, so that from the camera side of the celluloid, a constant level of brightness is maintained for a given image projected, regardless of the grey scale gradient of the celluloid strip selected as the image manifest surface.

Torque motor 27, has an advancing motor 28 within its housing which moves the rollers, and thus celluloid length, in either direction on receipt of celluloid advance signal D7; this torque/advance motor combination has means to advance intermittently the rollers, in a possible configuration, not less than 20 mm, up to 30 times each second. Also, a switch triggered as the celluloid nears the end of its length on either roller, reverses the direction of the advancement, without slowing or interrupting the intermittent motion.

The camera unit's scan of the emulsion layer of the celluloid image-manifest area 32, on which both the camera and the projection are focused, is of a type which reproduces the maximum number of the scan lines manifested on the celluloid surface; both units being aligned appropriately, the high definition camera should scan synchronously with the projector, maintaining a high degree of definition and image integrity in videographing the projection, without noticeably altering the projected color components. The resulting image videographed will embody the selected grain textured appearance of the celluloid emulsion as an aspect of the overall video image.

The high definition signal output by the camera unit may be subjected to external peaking and filtering controls 16, or may be converted by an external unit 18 to NTSC standards for broadcasting or standard monitor display 20, or recording 19; an external aesthetic color adjusting system 17, familiar in adjusting signals derived from telecine transfers, may also be employed in final signal adjustments. The high definition camera signal may be recorded directly by high definition master VTR 14, in response to insert frame record signal D9, or the signal may be output to the deck by optional external components 16 or 17, depending on final signal patching.

From the high definition master VTR 14, the image is relayed as a complete frame to compatible high definition monitor 15. From this balanced monitor display, all aesthetic system adjustments to a scene are made by previewing a single frame and those resulting changes different film stock programs, celluloid density strips for projection, or manual adjustments made through external color or signal modifiers would have on the original video image. In a more sophisticated system, technology such as cascade filtering circuit technology, (U.S. Pat. No. 4,885,787) may provide means to modify pixel data quickly enough to preview and view modifications of scenes in real time, so option settings need not be made according to the appearance of a single image and realtime modifications can be seen before they are insert recorded. A configuration of the system of the present invention may also provide for a system computer with an internal memory capable of recalling an entire film stock program, instead of just one look-up-table, the minimum amount of data necessary for modification of a complete video frame; this would save time during set-up for modification of each new scene having a different corresponding look-up-table within the same film stock program. Additionally, principal videographic variables input through controls 43 and/or recorded automatically on a data track corresponding to each shot or scene could provide means for automatically loading and/or referencing a given look-up-table, rendering manual input of variables corresponding to each shot unnecessary, and allowing for the option of unmanned, off-line modifications of material for aesthetic evaluation of results and options.

Though the present system strives to maintain a superior video definition level to NTSC, PAL or other television standard throughout to compensate for any loss of original image integrity incurred through the film grain-instilling process of apparatus 13 (FIG. 1), a configuration of this system for the purpose of deriving an NTSC, PAL or other television standard signal from NTSC, PAL or other television standard video originated material is possible with a corresponding compromise to the image derived from the resulting video signal. Referring to FIG. 1, camera 1 might be replaced by a well balanced NTSC, PAL or other television standard unit with its signal being recorded on a broadcast NTSC, PAL or other television standard deck, 2. NTSC deck 4, would relay a frame of video to analog-digital converter 5, and this digital data would be held in store 6, which would be of a corresponding lesser capacity than the former store which held data binary data for a high definition video frame. Computer 7 would execute a total number of pixel-component modifications per frame of approximately half that needed for the high definition configuration, and thus the time frame needed for this phase could be correspondingly reduced. The programs and look-up-tables would remain the same, as they address the modification of each pixel, and would not be changed by the fact that fewer total pixels per frame are being modified. Store 11 would need only the capacity to hold data supplied by computer 7 corresponding to the number of resolved lines provided by the television standard used. This frame would be converted to analog format by converter 12 and the resulting signal could be output to an external scandoubling system which would provide high definition compatible projector 21 (FIG. 3), with a signal it would project as an image with an increased number of resolved lines, as compared to a signal where blanking manifests itself as a black line between two resolved lines.

The film grain instilling assembly 13 would remain the same, with the camera unit 22 (FIG. 3), being replaced by a unit of the selected television standard, such as those used in present telecine "film-to-tape" systems. The option of filtering and peaking controls 16 and external color correction 17 would remain, and the selected television standard signal could be routed directly from the camera unit 22 or from the optional modifier(s) for final recording by a master record deck replaced in this configuration by an NTSC broadcast format unit 19. Final display for system previewing and reviewing would occur on monitor 20, replaced by a unit of the selected television standard, such as higher performance NTSC units used in conjunction with telecine film-to-tape transferring systems. All other system functions and data signals would remain as in the high definition configuration.

As the configuration of this system can take optional forms to conform to different television standards and display uses, it is important to note that although the preferred embodiment discloses a system in which a digital signal is converted to analog and then back to digital within the two step modification process, another configuration of this system may employ all digital components, rendering all analog-digital-analog conversions unnecessary.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for processing information in an image originated on a first medium into data representative of a modified image simulating an image originated on a selected second medium, comprising:
    producing digital data representative of the color component response of a selected second medium under a selected group of variables affecting the response of the second medium to subject colors;
    storing said digital data in a memory for use in modifying digital data representative of color component values within said image originated on the first medium to simulate each corresponding component response within an image originated on said second medium; and
    correlating data groupings derived from said image originated on said first medium with said digital data representative of the color component response of the selected second medium, said data groupings representing color component responses of the first medium to a selected range of subject colors under a selected number of variables affecting the response of the first medium.

2. The method claimed in claim 1, further wherein:
    said step of storing digital data representative of the color component response of a selected second medium comprises storing data to which selected data groupings of said first medium color component responses is modified.

3. The method claimed in claim 1, further wherein:
    said information defines a selected second medium's detailed color component response range as data able to be referenced against the first medium's selectively detailed color component response range.

4. The method claimed in claim 1, wherein the first medium comprises video and the second medium comprises photographic film.

5. Apparatus for processing information in an image on a first image storing medium into data representative of a modified image simulating an image originated on a second image storing medium, comprising:
    means for producing digital data representative of the color component response of a selected second medium under a selected group of variables affecting the response of the second medium to subject colors;
    means for storing said digital data in a memory for use in modifying each digital component in the image originated from the first medium to simulate each corresponding component of an image originated from the second medium; and
    means for correlating data groupings derived from the image from the first medium with said digital data representative of the color component response of the selected second medium, said data groupings representing color component responses of the first medium to a selected range of subject colors under a selected number of variables affecting the response of the first medium.

6. The apparatus claimed in claim 5, further wherein: said means for storing information representative of the color component response of a selected second medium comprises means for storing data to which selected data groupings of said image originating in the first medium color component responses is modified.

7. The apparatus claimed in claimed in claim 5, further wherein:
said information defines a selected second medium's selectively detailed color component response range as data able to be referenced against the first medium's selectively detailed color component response range.

8. The apparatus claimed in claim 5, wherein the first medium comprises video and the second medium comprises photographic film.

* * * * *